United States Patent [19]

Symbolik et al.

[11] Patent Number: 5,455,057
[45] Date of Patent: Oct. 3, 1995

[54] PREPARATION OF A SOLUBLE COFFEE GRANULATE PRODUCT

[75] Inventors: William S. Symbolik, Marysville; Sean P. Cotter, Dublin; James E. Wimmers, Marysville; Shirdan J. Grykiewicz, Johnstown, all of Ohio

[73] Assignee: Nestec S.A., Vevey, Switzerland

[21] Appl. No.: 304,358

[22] Filed: Sep. 12, 1994

[51] Int. Cl.$^6$ ............................................ A23F 5/36
[52] U.S. Cl. ...................... 426/385; 426/594; 426/285; 426/453; 426/388
[58] Field of Search ................................ 426/594, 385, 426/285, 453, 388

[56] References Cited

U.S. PATENT DOCUMENTS

| | | |
|---|---|---|
| 3,493,388 | 2/1970 | Hair . |
| 3,554,760 | 1/1971 | Sienkiewicz et al. . |
| 3,652,293 | 3/1972 | Lombana et al. . |
| 3,821,429 | 6/1974 | Jolly et al. . |
| 3,821,430 | 6/1974 | Reeves et al. . |
| 4,594,256 | 6/1986 | Zemelman et al. . |
| 4,594,257 | 6/1986 | Leblanc et al. . |
| 4,594,258 | 6/1986 | Vitti et al. . |
| 4,640,839 | 2/1987 | Hsu . |
| 5,375,776 | 12/1994 | Kupper et al. . |

OTHER PUBLICATIONS

Sivetz, et al., *Coffee Technology*, AVI Publishing Company, Inc., Westport, Conn. (1979) pp. 484–498; 532; and 538–539.

*Primary Examiner*—Joseph Golian
*Attorney, Agent, or Firm*—Vogt & O'Donnell

[57] ABSTRACT

A soluble coffee product which has the appearance of roast and ground coffee particles. The product is produced by a process in which a coffee extract is frozen, comminuted into particles, freeze-dried, and darkened. During the process, the particles are separated into an oversize fraction of size greater than about 1.1 mm (16 US Standard mesh), a fines faction of size less than about 0.87 mm (20 US Standard mesh), and a middle fraction of size between the oversize fraction and the fines fraction. Then, the middle fraction is separated into a by-pass fraction and a major fraction, the by-pass fraction forming 2 to 20% by weight of the middle fraction. The major fraction and the fines fraction are then combined and the particles in the combination are darkened. The darkened particles and the by-pass fraction are then combined to provide the soluble coffee product.

23 Claims, 5 Drawing Sheets

PREPARATION OF A SOLUBLE COFFEE GRANULATE PRODUCT

FIELD OF THE INVENTION

This invention relates to a process for providing a soluble coffee product which has the appearance of roast and ground coffee particles. The invention also relates to a soluble coffee product so produced which has the appearance of roast and ground coffee particles.

BACKGROUND OF THE INVENTION

Soluble coffee, although a very popular product, suffers the disadvantage that it does not have the appearance of coffee particles obtained by the grinding of roasted coffee beans. Soluble coffee granules are usually of a reasonably uniform, rounded shape while roast and ground coffee particles usually appear to have various shapes; often sharp. Also, the color of soluble coffee is lighter and more uniform than the color of roast and ground coffee. In particular, typical roast and ground coffee is reasonably dark in color but contains a noticeable fraction of larger, lighter colored material which gives it a speckled appearance. For example, when measured on an Agtron colorimeter, roast and ground coffee particles usually have a color in the range of 60 to 65 Agtron units while soluble coffee particles have a color in the range of 75 to 90 Agtron units; which is much lighter. The particle size distribution of soluble coffee is also different from that of roast and ground coffee. Further, the bulk densities of soluble coffee granules and roast and ground coffee particles also differ.

However, it has been long appreciated that a soluble coffee product which better simulates the appearance of roast and ground coffee particles is likely to be much more acceptable to the consumer. The reason is that consumers often associate a product, which has the appearance of roast and ground coffee, with quality. Consequently there have been many attempts to alter the appearance of soluble coffee so that it better simulates that of roast and ground coffee. Unfortunately, this has proved to be difficult since many of the characteristics of soluble coffee are interrelated and hence altering one to produce a beneficial effect often results in an adverse effect in another characteristic. Also, many constraints exist; for example the bulk density of the product should be such that a teaspoon of the product yields an acceptable cup of coffee. Altering the size distribution or using processes to alter the color can result in unacceptable changes to the bulk density.

One of the earlier attempts to provide a product which better approximates the appearance of roast and ground coffee is described in U.S. Pat. No. 3,821,429. Here a first portion of darker coffee granules is produced by spray drying a coffee extract. Then a lighter portion is produced by freeze drying a coffee extract under selected conditions to provide a product which has a color of at least 5 Hunter L scale units less than the dark portion. The two portions are then mixed in the amount of 10% to 50% light portion to 90% to 50% dark portion. An agglomerating fluid is then distributed over the mixture to cause the granules to become tacky and adhere to other granules. The mixture is meanwhile agitated until at least 80% of the particles have a size in the range of 12 to 48 US standard mesh (about 1.41 mm to 0.297 mm). If necessary the product is dried and packed. The process is complicated in that both spray dried and freeze dried coffee is used. Also the process does not address many of the characteristics of soluble coffee granules which differ from roast and ground coffee.

Another early attempt is disclosed in U.S. Pat. No. 3,493,388. In this process, spray dried particles passing through a 16 US standard mesh (about 1 mm) are first produced. The particles are then chilled and ground to pass through a much finer screen, for example a 100 US standard mesh (about 149 microns). The particles are then agglomerated in a steam agglomerator under specific conditions and dried. Agglomerates which are too fine or too coarse are removed and recycled. The agglomerate obtained is dark. Simultaneously, a lighter colored, freeze dried product of reasonably similar particle size distribution is prepared. The freeze dried product however has a lower moisture content than the spray dried product. The two products are then mixed with the mixture containing more darker agglomerates than lighter agglomerates. The product is said to have a speckled appearance and the two portions are said not to separate during storage since, due to the difference in moisture content, the agglomerates cling to one another. However the process is again complicated in that both spray dried and freeze dried coffee is used. Also again the process does not address many of the characteristics of soluble coffee granules which differ from roast and ground coffee.

A process which attempts to provide a product which has the appearance of roast and ground coffee but which has an acceptable bulk density is described in U.S. Pat. No. 4,594,256. Here spray dried coffee granules are milled to produce a powder of an average particle size of 25 to 75 microns. Then the cohesiveness of the powder is adjusted so that the particles have a cohesion index of 0.20 to 0.85. In this way, the particles bind together to form loosely packed clusters which will hold together during further processing. The clusters are vibrated and screened to give granules of regular shape and size in the range of 800 to 2100 microns. The granules are then subjected to steam agglomeration to produce agglomerates having a dark color. The granules have a density of 0.20 to 0.28 g/cm$^3$ and about 5% of the surface of the granules have a lighter color due to imperfect darkening. Processes deviating in minor aspects from this process are disclosed in U.S. Pat. Nos. 4,594,257 and 4,594,258. However again in all cases, not all characteristics of soluble coffee granules which differ from roast and ground coffee are addressed.

A darkening process which produces particles of different shapes, particularly shapes with sharp edges, is disclosed in U.S. Pat. No. 4,640,839. In most of the prior processes, the particles produced have smooth, rounded edges and a sponge-like texture very dissimilar to roast and ground coffee particles. In the process disclosed in U.S. Pat. No. 4,640,839, spray or freeze dried coffee powder is allowed to fall in a stream through a cloud of steam. The steam causes the surface of the particles to form a flowable phase, which may result in some agglomeration of particles. The particles are then dried. The dried particles have a speckled appearance and have irregular shapes with sharp edges. By varying the time spent in the steam cloud, the darkness of the product can be varied. Hence darker and lighter products can then be mixed. Although the process usefully produces particles of the required shapes and densities, there is no specific teaching on how to obtain certain other desired characteristics.

Therefore there is still a need for a relatively simple and economically viable process for producing a soluble coffee product which closely simulates the appearance of roast and ground coffee particles.

SUMMARY OF THE INVENTION

It is an object of this invention to provide a process for producing a soluble coffee product which closely simulate the appearance of roast and ground coffee particles.

Accordingly, in one aspect this invention provides a process for producing a soluble coffee product in which a coffee extract is frozen, comminuted into particles, freeze-dried, and darkened, wherein the improvement comprises (i) separating the particles into an oversize fraction of size greater than about 1.1 mm (16 US Standard mesh), a fines fraction of size less than about 0.87 mm (20 US Standard mesh), and a middle fraction of size between the oversize fraction and the fines fraction;

(ii) separating the middle fraction into a by-pass fraction and a major fraction, the by-pass fraction comprising 2 to 20% by weight of the middle fraction;

(iii) combining the major fraction and the fines fraction and darkening the particles in the combination to a color less than about 70 Agtron units; and (iv) combining the darkened particles and the by-pass fraction.

The coffee product so produced has a color of less than about 70 Agtron units which corresponds to that of roast and ground coffee, a speckled appearance, a density of about 0.20 to 0.30 g/cm³ which corresponds to that of roast and ground coffee, and a particle size distribution closely resembling that of roast and ground coffee. That such an acceptable product may be produced by the simple process defined is indeed surprising.

The separation of the particles into three fractions may take place prior to freeze drying, after drying, or partially before and partially after freeze drying.

Therefore, in one specific aspect this invention provides a process for producing a soluble coffee product, the process comprising:

(a) separating freeze dried coffee particles into an oversize fraction of particle size above about 1.1 mm (16 US standard mesh), a fines fraction of particle size less than about 0.87 mm (20 US Standard mesh), and a middle fraction of particle size between the oversize fraction and the fines fraction;

(b) separating the middle fraction into a by-pass fraction and a major fraction, the by-pass fraction comprising about 2% to about 20% by weight of the middle fraction;

(c) combining the major fraction and the fines fraction and subjecting the combination to darkening to produce darkened particles of color less than about 70 Agtron units, and then drying the darkened particles; and (d) combining the dried, darkened particles and the by-pass fraction.

Preferably, in step (a), the soluble coffee particles are separated into an oversize fraction of particle size above about 1.4 mm (16 US standard bolting cloth), a fines fraction of particle size less than about 0.87 mm (20 US Standard mesh), and a middle fraction of particle size between about 1.4 mm (16 US standard bolting cloth) and 0.87 mm (20 US Standard mesh).

Preferably the process further comprises the steps of subjecting the particles in the oversize fraction to gentle size reduction, and recycling them. To facilitate the size reduction, the oversize fraction may be split into two or more fractions which are separately subjected to size reduction. Preferably the oversize fraction is separated into a first fraction having particles of size greater than about 1.9 mm (11 US standard mesh) and a second fraction having particles of size greater than about 1.4 mm (16 US standard bolting cloth) but less than about 1.9 mm (11 US standard mesh).

In another aspect, this invention provides a process for producing a soluble coffee product, the process comprising:

(a) comminuting a frozen coffee extract under chilled conditions and separating the particles obtained into an oversize fraction of particle size above about 1.1 mm (16 US standard mesh) and a fraction comprising the remainder;

(b) subjecting the remainder fraction to reduced pressure to cause sublimation of frozen water in the particles and drying of the particles;

(c) separating the freeze dried particles into a large fraction of particle size above about 0.87 mm (20 US standard mesh) and a fines fraction comprising the remainder;

(d) separating the large fraction into a by-pass fraction and a major fraction, the by-pass fraction comprising about 2% to about 20% by weight of the large fraction;

(e) combining the major fraction and the fines fraction and subjecting the combination to darkening to produce darkened particles of color less than about 70 Agtron units, and then drying the darkened particles; and (f) combining the dried, darkened particles and the by-pass fraction.

Preferably, in step (a), the particles are separated at a temperature less than −40° C; for example about −45° C.

Preferably, in step (a), the oversize fraction has a particle size greater than about 1.5 mm (12 US standard mesh). Further, in step (c), the large fraction has a particle size above about 0.87 mm (20 US standard mesh) but less than about 1.5 mm (12 US standard mesh).

Preferably the process further comprises the steps of subjecting the particles in the oversize fraction to gentle size reduction, and recycling them. To facilitate the size reduction, the oversize fraction may be split into two or more fractions which are separately subjected to size reduction. Preferably the oversize fraction is separated into a first fraction having particles of size greater than about 11.1 mm (2 US standard mesh), a second fraction having particles of size greater than about 5.2 mm (4 US standard mesh), and a third fraction making up the remainder of the particles of size greater than about 1.5 mm (12 US standard mesh).

Preferably each of the oversize fractions is comminuted by passing the particles through a pair of rotating rollers; one of the rollers having knifes closely spaced apart from each other to cut the particles. To prevent melting of the particles, air at a temperature below −40° C., for example at −50° C., may be blown between the rollers.

In all aspects, the by-pass fraction preferably comprises 2% to 20% by weight and the processing major fraction comprises 98% to 80% by weight. More preferably, the by-pass fraction comprises about less than about 12%, for example about 5%, by weight.

Preferably, in all aspects, the particles are darkened by causing the particles to flow in a stream through a moistening zone and directing steam inwardly towards the centre of the stream of particles from about the stream so that the stream of particles are surrounded by and are moistened by the steam. Upon leaving the moistening zone, the particles may be dried by directing a hot gas at the stream of particles.

In another aspect, this invention provides a coffee product produced by the processes defined above.

In a yet further aspect, this invention provides a slicer for comminuting particulate matter, the slicer comprising a pair of rolls arranged in parallel and being rotatable in counter-rotation to draw particulate matter into a nip between them; one of the rolls forming a slicer roll and comprising a plurality of annular blades closely spaced from each other and each adjacent pair of blades having a stationary cleaning element between them, the cleaning element including an expelling portion projecting proud of the blades to expel particulate matter caught between and rotating with the blades. Preferably, each cleaning element comprises a thin, substantially planar member.

Preferably adjacent blades of the slicer roll are spaced a distance from each other less than the average particle size of the particulate matter fed into the slicer.

The other roll of the pair may form a feeder roll and include ribs on its circumferential surface running parallel to the axis of the feeder roll. In use, the ribs assist in feeding the particulate matter into the nip between the rolls.

Preferably the slicer roll is rotated at a speed such that the tangential velocity of the blades is greater than the tangential velocity of the feeder roll. Preferably the tangential velocity of the slicer roll is about twice that of the feeder roll.

The slicer may include air inlet means for directing chilled air into the nip between the rolls to cool particles being comminuted between the rolls.

The slicer provides the advantage that it is particularly suitable for comminuting frozen particles without the particles melting. Also, by suitably adjusting the spacing between the blades, the particle size of the comminuted particles may be controlled to a reasonable degree. The slicer is particularly advantageous in that the production of fines may be minimized.

In this specification, the term "Agtron Units", when referring to the color of the coffee particles, means the unit reading obtained from a color measurement device available Agtron, Inc, 1095 Spice Island Drive, Sparks, Nev. 89341, USA; lbr example the Agtron E-5C, E-10 and M-Basic models. These devices determine the infra-red reflectance of a coffee sample irradiated with monochromatic light at 811 nm. The values obtained from these devices are readily calibrated against the values obtained from similar devices which are commercially available.

DESCRIPTION OF THE DRAWINGS

Embodiments of the invention are now described, by way of example only, with reference to the drawings in which.

DETAILED DESCRIPTION OF THE INVENTION AND THE DRAWINGS

Figure 1:
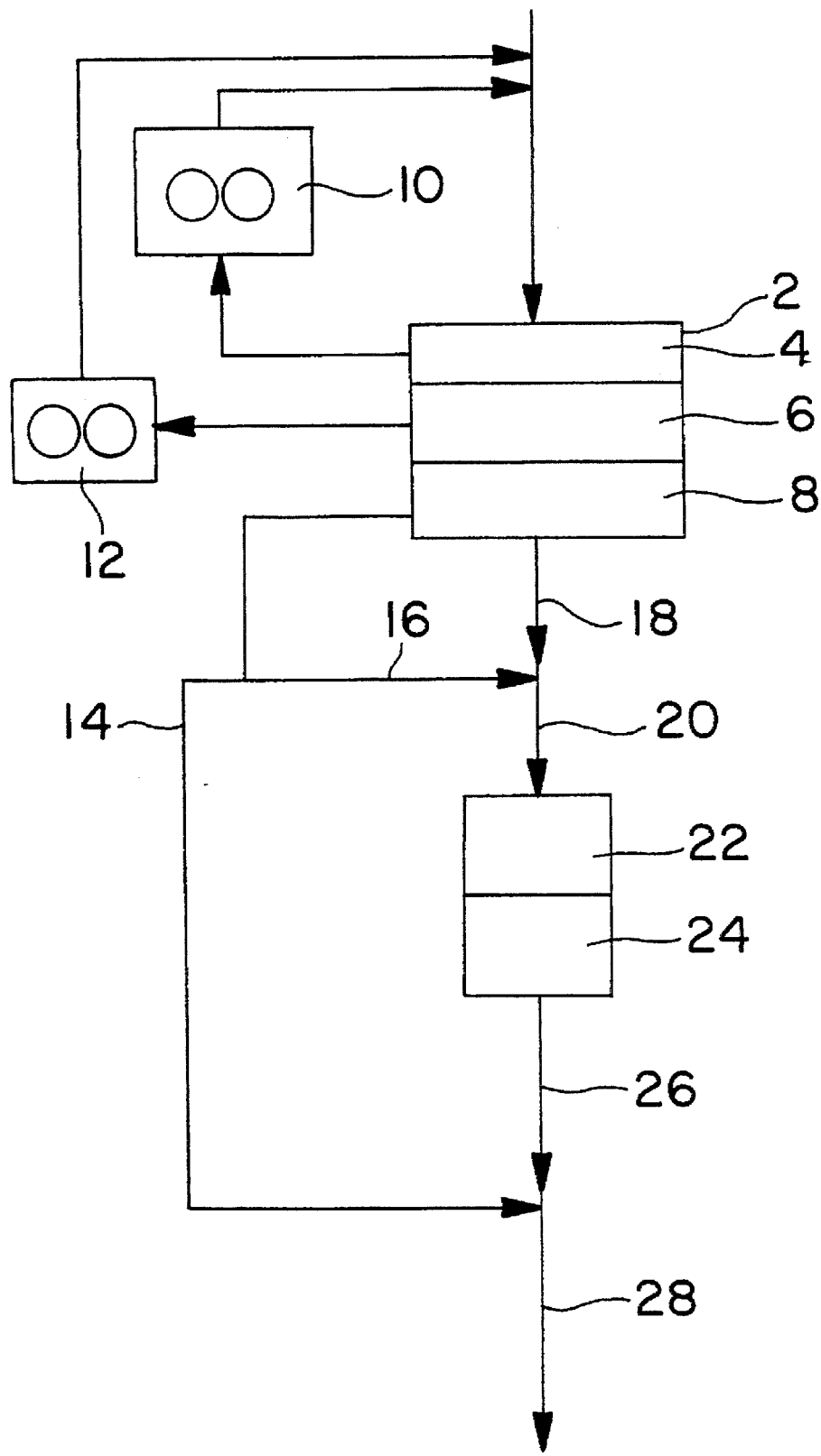
FIG. 1 is a schematic diagram of one process for producing the coffee product.

In a first embodiment illustrated schematically in FIG. 1, the coffee product is produced from a feed of freeze dried coffee particles obtained from, for example, conventional freeze-drying processes. In these processes, a coffee concentrate obtained by extraction of coffee is first chilled to a slush and then gassed with $CO_2$. Gassing with $CO_2$ reduces the density of the final product. The coffee concentrate is frozen using a suitable freezing technique; for example the SANDVIK belt freezing system is commonly used. Plainly, other systems such as tray systems and ice slicer systems may also be used since the procedure by which the coffee concentrate is frozen is not critical. The frozen coffee concentrate is then broken into pieces; usually in a multistage breaking apparatus. The particles of frozen coffee concentrate leaving the breaking apparatus include particles of size less than about 3.3 mm (6 US Standard Mesh); although larger particles are present. Thereafter the particles are screened, usually to remove particles of size greater than about 2.4 mm (8 US Standard Mesh) and less than about 520 microns (30 US Standard mesh). The particles of size greater than about 2.4 mm are usually transferred to a suitable mill for further comminution and are then returned to the screens. The particles of size less than about 520 microns are melted and reprocessed. The particles of size between 2.4 mm and 520 microns are then transferred to a freeze dryer where frozen water in the particles is caused to sublime. These freeze-drying processes are well known and are described, for example, in Sivetz, M. and Desrosier, N. W.; 1979; *Coffee Technology*, AVI Publishing Company, Inc, Westport, Conn., USA; pages 484 to 498.

Typically, the particles obtained from freeze-drying processes may have a bulk density of about 0.19 to about 0.28 g/cm$^3$. Using particles of these bulk densities would be acceptable, but for best results, particles of bulk density within the range of about 0.19 to 0.21 g/cm$^3$ are preferred. As would be appreciated by persons skilled in the art, the bulk density of the freeze dried particles may be adjusted as desired by adjusting the concentration of the initial coffee concentrate or the amount of $CO_2$ gas used during gassing; among other variables. Particles of bulk density within the range of 0.19 to 0.21 g/cm$^3$, when subjected to the process described below, produce a product having a bulk density in the range of 0.23 to 0.25 g/cm$^3$, which for many markets is the desired bulk density of the coffee product. However, the desired bulk density of the product may vary from market to market and hence the initial bulk density may be chosen accordingly.

The particle size distribution of the particles obtained from the freeze drying process usually stretches from about 2.4 mm (8 US Standard mesh) to about 520 microns (30 US Standard mesh); with the majority of the particles having a size filling within the range 1.5 mm (12 US Standard mesh) to 870 microns (20 US Standard mesh). Plainly, minor variations from these values are possible; as desired.

Using the feed obtained from the freeze-drying processes, the process of the first embodiment proceeds as follows. The particles are classified on a suitable three deck sifter 2 such as a Sweco Sifter which may be obtained from Sweco, Inc, 7120 New Buffington Road, Florence, Ky., USA. However any commercial sifter may be used. The top deck 4 contains a screen of openings equivalent to about 8 to about 12 US Standard mesh (about 2.4 mm to 1.5 mm), the middle deck 6 a screen of openings equivalent to about 14 to 18 US Standard mesh (about 1.3 mm to about 1.00 mm) and the bottom deck 8 a screen of openings equivalent to about 20 to about 24 US Standard mesh (about 0.87 mm to 0.70 mm). A sifter containing a 11 US Standard mesh screen (about 1.9 mm), a 16 mesh U.S. Standard bolting cloth (about 1.4 mm) and a 20 US Standard mesh (about 0.87 mm) screen operates well.

The particles larger than 11 US Standard mesh, discharged from the top deck 4, are then transferred to a first roller mill 10 where they are subjected to gentle size reduction. A suitable roller mill is a crackilizer mill; for example those which may be obtained from Modern Process Equipment, Inc., 3125 S Kolin Avenue, Chicago, Ill., 60623, USA. This roller mill consists of pairs of rolls mounted in parallel and turning counter rotation to one another. The speed of rotation and the gap between the rolls may be varied. The rolls each have triangular, circumferential cuts to facilitate size reduction. A gap between the rolls of 0.56 mm and rolls having 12 cuts per 25.4 mm may be used, for example. Plainly other suitable mills may be used.

The milled particles produced in the first roller mill 10 are then combined with further feed recycled back to the sifter 2. A suitable feeder device such as a bucket elevator may be used.

Similarly, particles discharged from the middle deck 6 are transferred to a second roller mill 12 where they are subjected to gentle size reduction. The second roller mill 12 is of the same type as the first roller mill 10 although the gap between the rolls may be larger and the number of cuts per unit length may be larger (for example a gap of 0.71 mm and 18 cuts per 25.4 mm). The milled particles produced in the second roller mill 12 are then combined with further feed and milled particles from the first roller mill 10 and recycled back to the sifter 2.

The particles discharged from the bottom deck 8 are separated into a by-pass fraction 14, which comprises about 2 to 20% by weight of the particles, and a second, major fraction 16 which comprises 98% to 80% by weight of the particles. Preferably the by-pass fraction 14 comprises about 5% by weight of the particles. The separation may be carried out by diverting all the particles discharged from the bottom deck 8 into the by-pass fraction 14 for short period of time and then redirecting them into the second fraction 16. For example, to obtain a by-pass fraction 14 comprising 5% by weight of the particles discharged from the bottom deck 8, the particles may be directed into the by pass fraction 14 for 1 minute in each 20 minutes of production. This may be repeated as necessary. Clearly, other suitable separation equipment may also be used. The by-pass fraction 14 has a light color measuring about 78 to 82 Agtron units.

The second fraction 16 is then combined with the fine particles 18 which passed through the bottom deck 8. The combined particles 20 are then transferred to a steam darkener 22. Any suitable steam darkener may be used; for example the steam darkener 22 described in U.S. Pat. No. 4,640,839, the disclosure of which is incorporated into this specification by reference. In such a steam darkener 22, the combined particles 20 fall from a led inlet hopper through a nozzle assembly into a tubular darkening chamber. The darkening chamber has a uniformly porous tubular wall. Steam is fed into a tubular outer chamber, extending about the darkening chamber, and diffuses through the porous wall and into the darkening chamber where it creates a cloud. Steam may also be fed into the darkening chamber through the nozzle assembly, concentrically about the stream of falling particles. The steam condenses on the particles passing through the cloud and causes a liquid or quasi-liquid flowable phase to form on the surfaces of the particles. As the particles collide with one another, the flowable phases of the particles merge causing the particles to fuse. By adjusting the residence time of the particles in the darkener 22, the darkness of the particles may be controlled.

Another steam darkener which may be used is that disclosed in U.S. Pat. 3,554,760, the disclosure of which is incorporated into this specification by reference. Further, any other suitable steam darkener, of which many are known in the art, may be used.

The particles then drop into a dryer 24 positioned beneath the steam darkener 22. Any suitable dryer 24 may be used; for example conventional dryers known in the trade as top-inlet dryers. In the dryer 24, moisture in the flowable phases is evaporated off. The particles 26 leaving the dryer 24 are darker than the combined particles 20 that were fed into the darkener 22 for example they have a color of 60 to 65 Agtron units.

The darker particles 26 are then combined with the by-pass fraction 14. The by-pass fraction 14 has a lighter color than the darker particles 26 and, when combined with the darker particles 26, gives a product which has the speckled appearance and color of roast and ground coffee particles. Also, due to the size classifications made, the product also has an acceptable density, and a size distribution which closely simulates that of roast and ground coffee particles.

After the first fraction 14 has been combined with the darker agglomerates 26, the product may be cooled in a suitable cooling unit.

Figure 2:
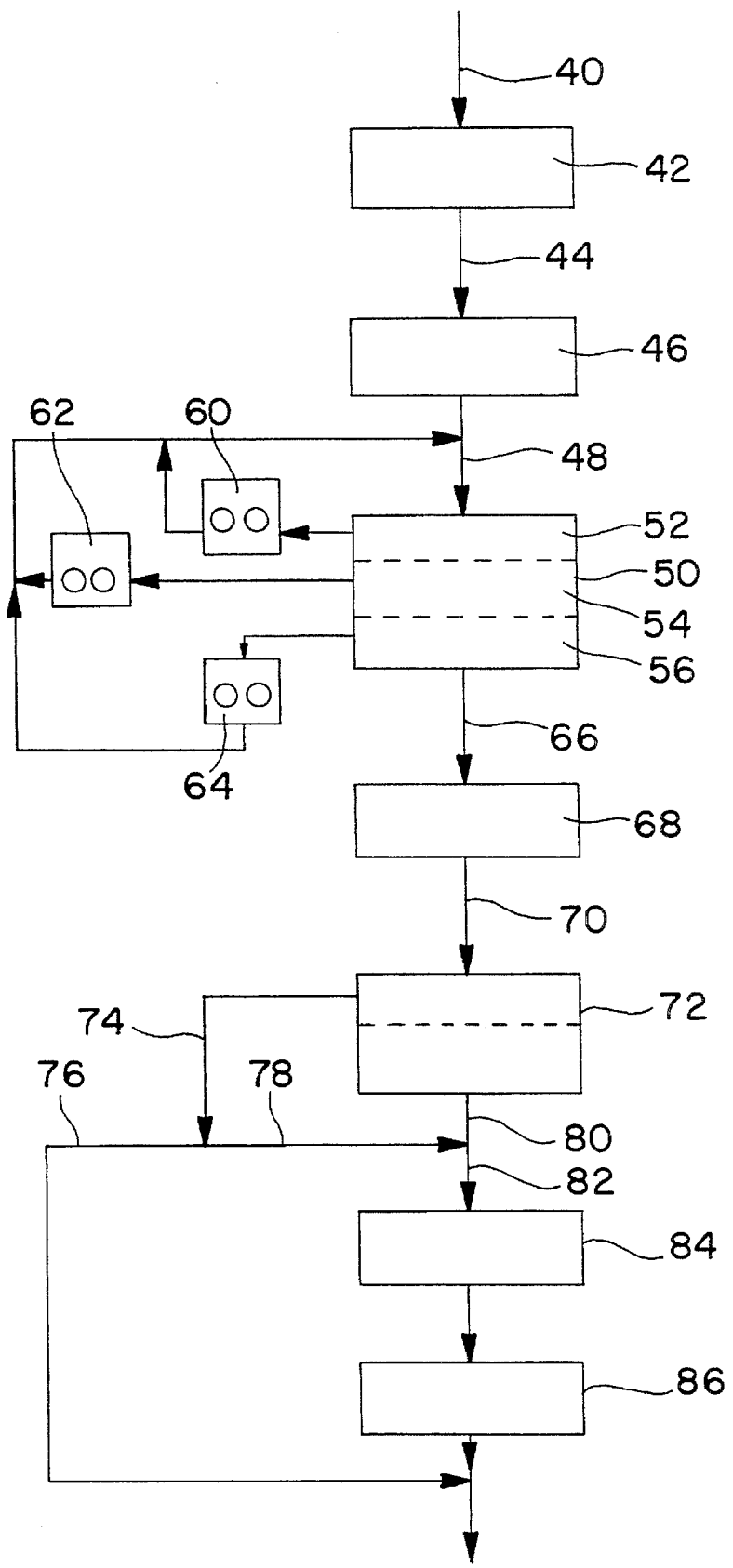
FIG. 2 is a schematic diagram of one process for producing the coffee product.

In a second embodiment illustrated in FIG. 2, much of the sizing of the particles takes place in the cold room before sublimation of the frozen water in the coffee concentrate. A coffee extract, obtained from a coffee extraction process, is chilled to slush and then gassed using $CO_2$ gas as is conventional. The gassed slush 40 is then transferred to a suitable freezer 42 (for example a SANDVIK belt freezer) and frozen as is conventional. The frozen extract 44 is then transferred to a multistage breaker 46 where it is broken up into pieces; again as is conventional. Usually, the frozen extract 44 is broken into pieces in two stages; a first rougher stage and a second finer stage.

The pieces 48 are then transferred to a sifter 50 for classification. For example, a rotary sifter obtained from EBM Mill & Elevator Supply, 1014 Sherwood Road, Norfolk, Nebr. 68701 may be used. In one example, the sifter 50 contains a top deck 52 each containing a screen of openings equivalent to about 2 US Standard mesh (about 11.1 mm), a middle deck 54 containing a screen of openings equivalent to about 4 to about 6 US Standard mesh (about 5.2 mm to about 3.4 mm) and two bottom decks 56 containing each a screen of openings equivalent to about 8 to about 12 US Standard mesh (about 2.4 mm to 1.5 mm). A sifter containing a 2 US Standard mesh screen (about 11.1 mm), a 4 mesh U.S. Standard mesh screen (about 5.2 mm) and two 12 US Standard mesh (about 1.5 mm) screens operates well. It will be appreciated that this classification step is carried out at temperatures well below 0° C. to prevent melting of the frozen particles, for example at temperatures of −45.6° C. (−50° F.).

The particles discharged from the top deck 52 are then transferred to a first mill 60 where they are subjected to gentle size reduction. A suitable mill as is used in the art to further comminute oversized particles in the cold room may be used. The milled particles produced in the first mill 60 are then combined with further feed recycled back to the sifter 50. Similarly, particles discharged from the middle deck 54 are transferred to a second mill 62 where they are subjected to gentle size reduction. The milled particles produced in the second mill 62 are then combined with further feed and milled particles from the first mill 60 and recycled back to the sifter 50. The particles discharged from the bottom decks 56 are transferred to a third mill 64 where they are subjected to gentle size reduction. The milled particles produced in the third mill 64 are then combined with further feed and milled particles from the first and second mills 60, 62 and recycled back to the sifter 50.

The arrangement of three different sized decks was chosen so that the feed to any of the first, second and third mills 60, 62, 64 contains particles of a narrow size range. This facilitates the milling of the particles since then each mill does not need to deal with particles of greatly varying size ranges. It will be appreciated that the number of the mills (and hence the number of decks) may be reduced if mills which are able to deal with particles of greatly varying size ranges, are used.

As mentioned. the first, second and third mills 60, 62, 64 may be any suitable mill; for example mills conventionally used in coffee processing to comminute frozen coffee particles. However, if it is desired to reduce the amount of fines of size less than 30 US Standard mesh (about 520 microns), it has been found useful to employ a slicer 100 as illustrated in FIGS. 3 to 6 to comminute the particles. The slicer 100 has a power feed roll 102 and a knife arbor 104 each mounted in a housing 106. The axis of the power feed roll 102 and the axis of the knife arbor 104 are arranged in parallel; the diameter of the power feed roll 102 being larger than the diameter of the knife arbor 104. The power feed roll 102 is connected to a drive shaft 108 which, in turn, is connected to a suitable drive mechanism (not shown). The drive mechanism is preferably a variable speed drive. Similarly, the knife arbor 104 is connected to drive shaft 110 which, in turn, is connected to a suitable drive mechanism (not shown). The drive mechanism is preferably a variable speed drive. The drive shaft 110 may be held in place with respect to the housing 106 by suitable bearings (not shown).

Figure 3:
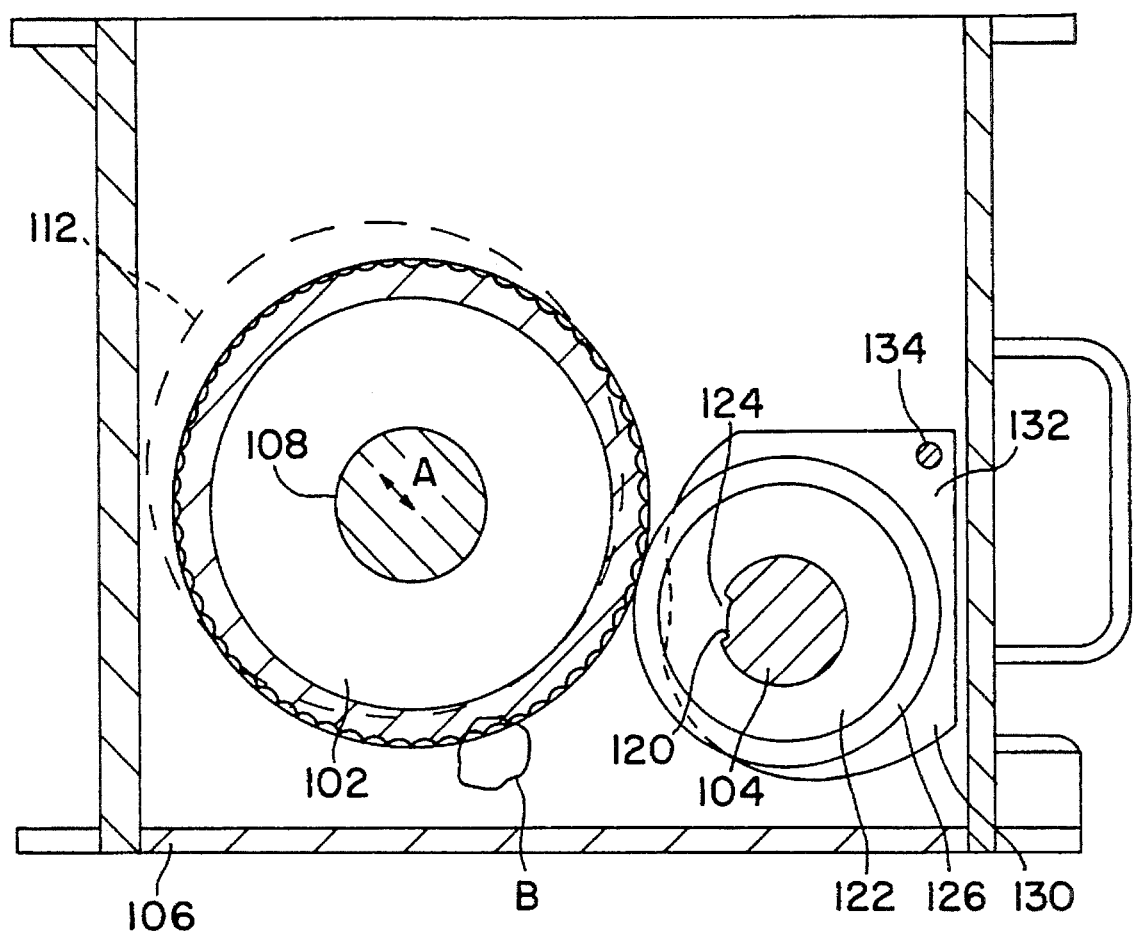
FIG. 3 is a schematic cross-section of a slicer.

The drive shaft 108 for the power feed roll 102 is held in a suitable movable bearing system (not shown) which permits the power feed roll 102 to be moved a small distance upwardly and away from the knife arbor 104. This movement is illustrated by arrow A in FIG. 3. In this way, the gap between the knife arbor 104 and the power feed roll 102 may be varied. The extent of movement of the power ted roll 102 away from the knife arbor 104 is illustrated by the broken line 112. The interior of the power feed roll 102 may be hollow as illustrated in FIG. 3 (for example for the passage of cooling fluid through it) but may also be solid; as desired.

Figure 4:
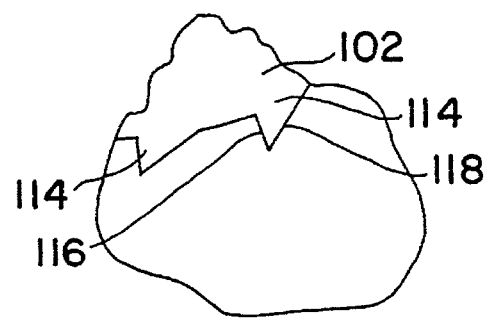
FIG. 4 is an expanded view of area B of FIG. 3.
Figure 5:
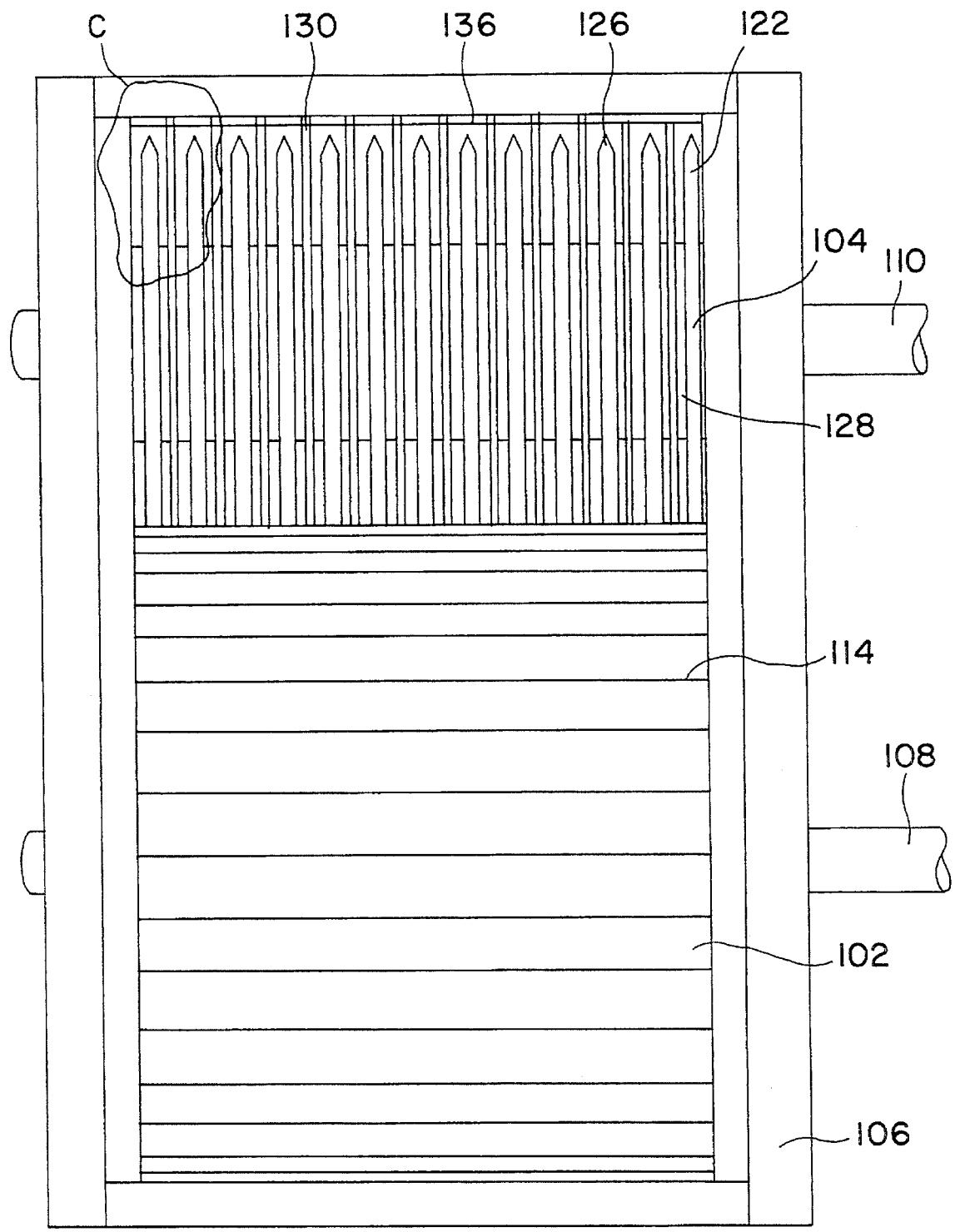
FIG. 5 is a top view of the slicer of FIG. 3.

As best illustrated in FIG. 4, the exterior circumferential surface of the power feed roll 102 is provided with ribs 114 projecting from it. Each rib 114 extends from one end of the power feed roll 102 to the other and the leading edge 116 of each rib 114 projects normally from the exterior circumferential surface of the power feed roll 102. The trailing edge 118 of each rib 112 inclines back to the exterior circumferential surface of the power feed roll 102 at an acute angle to the leading edge 116. An angle in the range of 40° to 60° is preferred.

The knife arbor 104 has a slot 120 cut into it which extends along its length. A multiplicity of thin annular blades 122 are carried on the knife arbor 102. Each annular blade 122 has a tab 124 projecting inwardly of its inner bore; the tab 124 being complementary to the slot 120 of the knife arbor 104. In this way, the tabs 124 key into the slot 120 so that rotation of the knife arbor 104 causes rotation of the annular blades 122 without slippage. Each annular blade 122 is of substantially uniform cross-section apart from a cutting portion 126, adjacent the outer edge each of the annular blade 122. At the cutting portion 126, each annular blade 122 tapers inwardly from either side to a knife edge.

Figure 6:
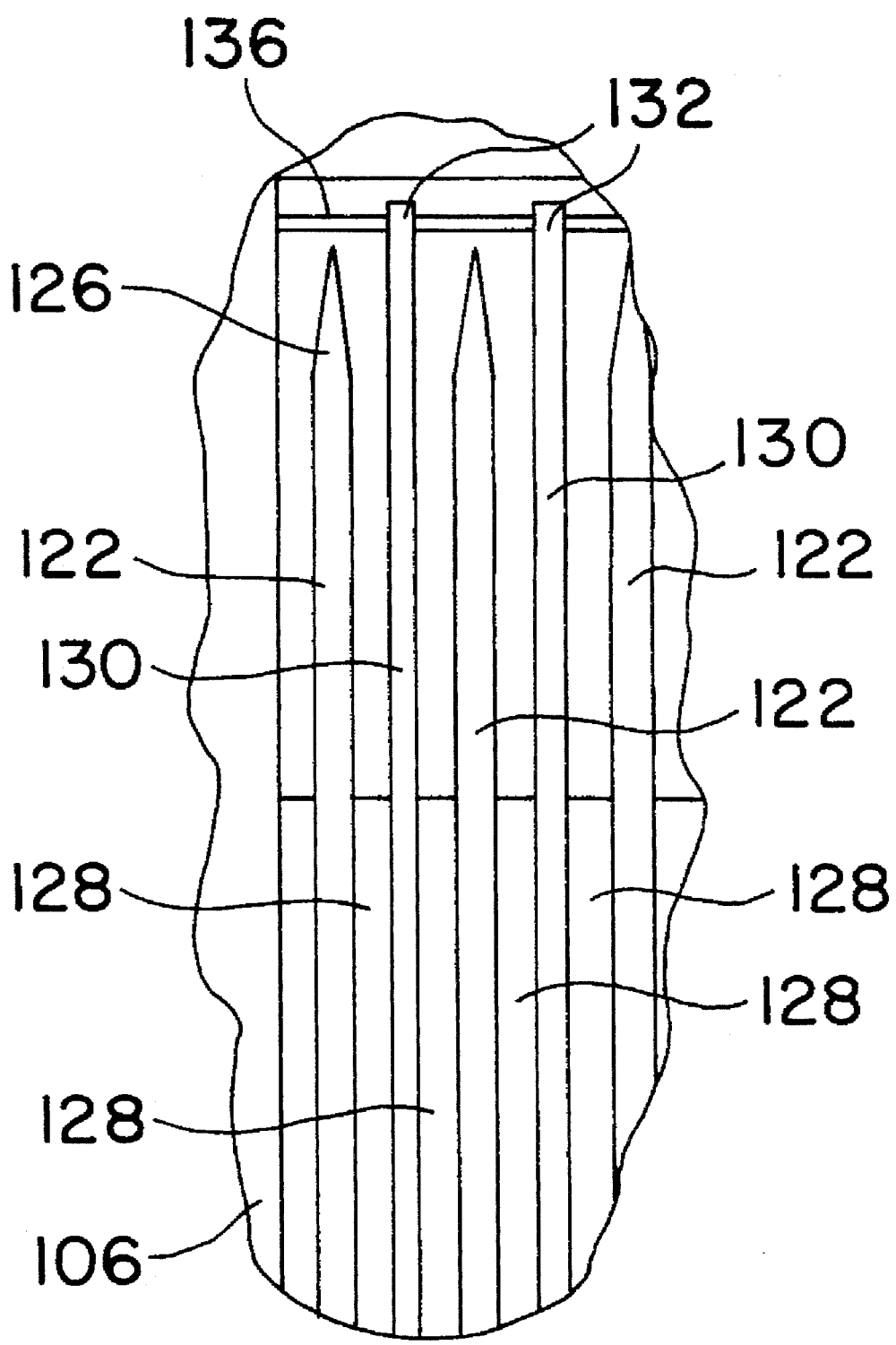
FIG. 6 is an expanded view of area C of FIG. 5.

As best illustrated in FIG. 6, each adjacent pair of annular blades 122 is separated by two annular spacer discs 128. The spacer discs 128 have an outer diameter less than that of the annular blades 122 but an inner diameter of the same size as the inner diameter of the annular blades 122. Each spacer disc 128 also has a tab (not shown) projecting inwardly of its inner bore; the tab keying with the slot 120 of the knife arbor 104. In this way, the spacer discs 128 also rotate with the knife arbor 104 without slippage.

A thin cleaning element 130 is positioned about midway between each pair of adjacent spacer discs 128. In this way an arrangement of a spacer disc 128, a cleaning element 130, and another spacer disc 128 is found between each pair of adjacent blades 122. It is also possible to omit one of the spacer discs 128 between each pair of adjacent blades 122 to provide an arrangement of a spacer disc 128 and a cleaning element 130 between each pair of adjacent blades 122. Each cleaning element 130 has an inner bore (not shown) through which the knife arbor 104 passes, but does not have a tab keying in with the slot 120 of the knife arbor 104. When fitted on the knife arbor 104, each cleaning element 130 has a rear portion 132 (facing away from the power feed roll 102) projecting proud of the adjacent annular blades 122. An aperture 134 is cut through each rear portion 132 and a rod 136 is threaded through each aperture 134 to inter-connect the cleaning elements 130. The rod 136 is fixed at both of its ends to the housing 106. Hence, the cleaning elements 130 remain stationary when the knife arbor 104 rotates. The forward portion of each cleaning element 130 is rounded and extends a distance (from the axis of the knife arbor 104 towards the axis of the power feed roll 102) less than the outer radius of the annular blades 122. The lower and upper portions of the cleaning element 130 may also project proud of the annular blades 122 as shown.

In use, the power feed roll 102 and the knife arbor 104 are rotated in counter-rotation so as to draw particles falling from above into the nip between them. Particles to be comminuted are introduced from above and are carried by the power feed roll 102 into the nip between the power feed roll and the blades 122 on the knit arbor 104. The particles passing through the nip are subjected to cutting which reduces their size. The particles are then carried past the nip and drop below the knife arbor 104. Thereafter they may be removed; continuously or batch wise. The cleaning elements 130, since they are fixed, prevent small particles from sticking between the rotating blades by dislodging these particles when the particles are rotated into contact with the cleaning elements 130.

In a specific example, the spacing between adjacent blades 122 of the first mill 60 is about 8.9 mm (about 0.35 inches); a little less than the size of the particles introduced into the first mill 60. The spacing between adjacent blades 122 of the second mill 62 is about 4.2 mm (about 0.165 inches); a little less than the size of the particles introduced into the second mill 60. Similarly, the spacing between adjacent blades 122 of the third mill 62 is about 1.9 mm (about 0.075 inches); a little less than the size of the particles introduced into the second mill 60.

The components of the slicer 100 may be made of any suitable material; for example stainless steel. The cleaning elements may also be made of food grade polycarbonate or a low friction metal such as Nitronics 60. Nitronics 60 is a stainless steel alloy with a high nickel content and which has anti-friction properties when placed against a moving metallic element.

Since the particles to be comminuted are frozen coffee particles, it will be appreciated that the slicer 100 is operated under conditions of substantially reduced temperature to prevent melting of the particles. Temperatures of below about −40° C. are preferred; for example about −45.6° C.

Further, to reduce local heating of the particles as they pass between the power feed roll 102 and the blades 122; cold gas (for example air) may be introduced between the power feed roll 102 and the blades 122. For example, air at a temperature of about −50° C. (−58° F.) has been found to be suitable.

The particles 66 falling through the bottom decks 56 in the sifter 50 are then transferred to a freeze dryer 68 where frozen water in the particles is caused to sublime. Any commercial freeze dryer may be used. The freeze dryer may be operated in accordance with manufacturer's instructions; for example at a pressure of 200 to 400 microns Hg, a temperature of about 160° C. to 190° C. and for a time of 5 to 6 minutes.

The freeze dried particles 70 are then transferred to a second sifter 72 that contains a single deck having a screen of 20 to 24 US Standard mesh (about 0.87 mm to 0.70 mm); preferably 20 US Standard mesh (about 0.87 mm). Any suitable sifter such as those obtained from Sweco, Inc may be used. The process then proceeds as described above with reference to FIG. 1. The particles 74 discharged time the screen are separated into a by-pass fraction 76 and a second fraction 78. The second fraction 78 is combined with the fines 80 passing through the screen and the combination 82 is transferred to a steam darkener 84 as described above. The darkened particles are then dried in a drier 86 and then combined with the by-pass fraction 76.

The process of the second embodiment offers certain advantages over that of the first embodiment; these are: less thermal degrading of the product because the comminuting and sizing of the product is done at low temperatures in the cold room. Further, since the particles submitted to the freeze dryer 68 are smaller, drying rates are faster. Moreover, particularly if the slicer 100 or similar apparatus is used, the amount of fines produced of size less then about 520 microns is much reduced. Ordinarily, these fines would be melted and returned to the freezing stage since roast and ground coffee does not contain significant amounts of such fines. Consequently an instant coffee which simulates the appearance of roast and ground coffee should not contain significant amounts of these fines. However recycling the fines reduces the efficiency of the freeze drying process and results in degradation of the organoleptic properties of the fines. Avoidance of these problems by using the process of the second embodiment provides a significant advantage. Another advantage is that the final product is darker since there is less fracturing of particles during sizing; it will be appreciated that fracturing results in the exposure of new surfaces which are lighter in color.

Example 1

Freeze dried coffee particles obtained from a commercial freeze drying process are used. The particles have a bulk density of about 0.217 g/cm$^3$, a color of about 75 to 80 Agtron units, and a particle size distribution of:

| Particle Size (US standard Mesh/mm) | Weight % |
| --- | --- |
| >10/2.00 | 18.17 |
| >12/1.5 | 21.00 |
| >14/1.3 | 22.85 |
| >16/1.1 | 11.60 |
| >20/0.87 | 11.68 |
| >30/0.52 | 6.44 |

| Particle Size (US standard Mesh/mm) | Weight % |
| --- | --- |
| <30/0.52 | 8.57 |

The particles are classified on a three deck sifter of 1.2 m (inch) diameter obtained from Sweco, Inc. The top deck contains a 11 US Standard mesh screen (about 1.9 mm), the middle deck a 16 mesh U.S. Standard bolting cloth (about 1.4 mm) and the lower deck a 20 US Standard mesh screen (about 0.87 mm).

The particles discharged from the top deck are transferred to a crackilizer mill obtained from Modem Process Equipment, Inc (Model 66) where they are subjected to gentle size reduction. A gap of 0.56 mm is selected and rolls having 12 cuts per 24.5 mm are used. The mill speed is about 200 to 300 rpm. Similarly, the particles discharged from the middle deck are transferred to crackilizer mill where they are subjected to gentle size reduction. A gap of 0.71 mm is selected and rolls having 18 cuts per 25.4 mm are used. The mill speed is about 200 to 300 rpm. In both cases, the comminuted particles are returned to the sifter and further classified.

The particles caught on the bottom deck are separated into a by-pass fraction 14 comprising about 5% by weight of the particles, and a major fraction comprising about 95% by weight of the particles. The major fraction is combined with the particles passing through the bottom deck and fed into a steam darkener. The steam darkener is as described in U.S. Pat. No. 4,640,839. Steam at about 0.4 bar (6 psig) is fed into the body of the darkener and steam at about 0.02 bar is fed around the feed nozzle of the darkener. Air heated to about 107° C. (225° F.) is fed into the dryer beneath the darkener to dry the particles. The darkened particles are then combined with the by-pass fraction and cooled.

The resulting product has a speckled appearance and the particles have a flaked appearance, both similar to roast and ground coffee. The color is about 65 Agtron units which is about the same as roast and ground coffee. The particle size distribution as compared to commercial roast and ground coffee is as follows:

| Particle size (US mesh/mm) | Example % by weight | Roast and Ground % by weight |
| --- | --- | --- |
| >16/1.1 | 8.47 | 17.77 |
| >20/0.87 | 40.56 | 40.67 |
| >30/0.52 | 22.18 | 21.17 |
| <30/0.52 | 28.79 | 18.65 |

As may be seen, the particle size distribution is very similar to that of a typical roast and ground coffee. The bulk density of the particles is 24.36 g/cm$^3$ which is good.

Example 2

Two batches of freeze dried coffee particles obtained from a commercial freeze drying process are used. The particles of the first batch have a bulk density of about 0.224 g/cm$^3$ and those of the second batch a bulk density of about 0.209 g/cm$^3$. The color of both batches is about 75 to 80 Agtron units. Both batches are processed separately as described in example 1.

The resulting products have a speckled appearance and the particles have a flaked appearance, both similar to roast and ground coffee. The color of both products is about 65 Agtron units which is about the same as roast and ground coffee. The particle size distribution of both products is as follows:

| Particle size (US mesh/mm) | Batch 1 % by weight | Batch 2 % by weight |
| --- | --- | --- |
| >16/1.1 | 19.64 | 15.52 |
| >20/0.87 | 36.20 | 40.77 |
| >30/0.52 | 21.05 | 22.40 |
| <30/0.52 | 23.11 | 21.32 |

As may be seen by comparison with the roast and ground data given in example 1, the particle size distributions are very similar to that of a typical roast and ground coffee. The bulk density of the particles of batch 1 is 22.35 g/cm$^3$ and that of batch 2 is 22.4 g/cm$^3$, both of which are good.

Example 3

Particles of frozen coffee concentrate obtained from a breaker are fed to a rotary sifter, of 0.46 m (18 inch) diameter and 3.35 m (11 feet) length, obtained from EBM Mill & Elevator Supply. The sifter has four screens; the fourth screen having openings equivalent to about 2 US Standard mesh (about 11.1 mm), the third screen having openings equivalent to 4 US Standard mesh (about 5.2 mm) and two bottom screens (a first and a second screen) having openings equivalent to 12 US Standard mesh (about 1.5 mm). The sifter is operated at a temperature of −45.6° C. (−50° F.).

Particles discharged from the fourth screen are transferred to a slicer as described above. The distance between the blades of the slicer is about 8.9 mm (0.35 inches). Particles discharged from the third screen are transferred to another slicer as described above. The distance between the blades of the slicer is about 4.2 mm (0.165 inches). Similarly the particles discharged from the second screen are transferred to a slicer as described above. The distance between the blades of the slicer is about 1.9 mm (0.075 inches). The power feed roll of each slicer is rotated at half the speed of the knife arbor. Air at −50° C. (−58° F.) is blown into the gap between the power feed roll and the blades. Comminuted particles are returned to the sifter.

The particles passing through the first screen are transferred to a freeze dryer and dried at a pressure of 200 to 400 microns Hg and at a temperature of about 160° C. (320° F.) and for a time of 5 to 6 minutes. The particles obtained have a density of 0.23 to 0.24 g/cm$^3$ and a moisture content of 3.0% by weight.

The particles are then classified on a sifter obtained from Sweco, Inc. using a 20 US Standard Mesh Screen (about 0.87 mm). The particles discharged from the screen are split into a by-pass fraction comprising 5% by weight and a major fraction. The major fraction is combined with the fines passing through the screen. The process then proceeds as described in example 1.

The resulting products have a speckled appearance and the particles have a flaked appearance, both similar to roast and ground coffee. The color of both products is about 65 Agtron units which is about the same as roast and ground coffee. The bulk density of the particles is about 25 g/cm$^3$ which is good.

We claim:

1. In a process for producing a soluble coffee product in which frozen coffee extract particles are freeze-dried and in which freeze-dried particles are darkened and dried, wherein the improvement comprises:
   (i) separating coffee extract particles selected from the group consisting of frozen particles and freeze-dried particles into an oversize fraction of particle size greater than about 1.1 mm (16 US Standard mesh), a fines fraction of particle size less than about 0.87 mm (20 US Standard mesh), and a middle fraction of particle size between the particle sizes of the oversize fraction and the fines fraction;
   (ii) separating the middle fraction into a by-pass fraction and a major fraction, the by-pass fraction comprising from 2 to 20% by weight of the middle fraction;
   (iii) combining the major fraction and the fines fraction to obtain a combined fraction;
   (iv) steam-darkening particles of a freeze-dried combined fraction to obtain darkened particles having a color of less than about 70 Agtron units and drying the darkened particles; and
   (v) combining the dried, darkened particles and a freeze-dried by-pass fraction to obtain a soluble coffee product.

2. A process according to claim 1 in which, in step (i), the particles which are separated are freeze-dried particles.

3. A process according to claim 1 in which, in step (i), the particles which are separated are frozen particles and in which, in step (ii), the middle fraction which is separated is freeze-dried particles.

4. A process according to claim 3 further comprising comminuting the oversize fraction particles to obtain a comminuted fraction and separating the comminuted fraction into a second oversize fraction and a remainder fraction.

5. A process according to claim 1 in which the by-pass fraction comprises from 2% to 20% by weight of the middle fraction and the major fraction comprises from 98% to 80% by weight of the middle fraction.

6. A process according to claim 5 in which the by-pass fraction comprises about 5% by weight of the middle fraction.

7. A process for producing a soluble coffee product comprising:
   (a) separating freeze-dried coffee particles into an oversize fraction of particle size above about 1.1 mm (16 US standard mesh), a fines fraction of particle size less than about 0.87 mm (20 US Standard mesh), and a middle fraction of particle size between the particle sizes of the oversize fraction and the fines fraction;
   (b) separating the middle fraction into a by-pass fraction and a major fraction, the by-pass fraction comprising from about 2% to about 20% by weight of the middle fraction;
   (c) combining the major fraction and the fines fraction and steam-darkening the particles of the combined fractions to a color of less than about 70 Agtron units, and then drying the darkened particles; and
   (d) combining the dried, darkened particles and the by-pass fraction.

8. A process according to claim 7 in which, in step (a), the freeze-dried coffee particles are separated into an oversize fraction of particle size above about 1.4 mm, a fines fraction of particle size less than about 0.87 mm, and a middle fraction of particle size between about 1.4 mm and 0.87 mm.

9. A process according to claim 7 further comprising size-reducing the oversize fraction particles for obtaining further middle fraction particles and further fines fraction particles.

10. A process according to claim 9 further comprising splitting the oversize fraction particles into two or more fractions and size-reducing the two or more oversize fractions.

11. A process according to claim 10 in which the oversize fraction particles are split into a first fraction having particles of size greater than about 1.9 mm and a second fraction having particles of size greater than about 1.4 mm but less than about 1.9 mm.

12. A process according to claim 7 in which, in step (c), the particles of the combined fractions are steam-darkened by passing the particles in a stream through a moistening zone and directing steam inwardly towards a center of the stream from about the stream so that the stream is surrounded and moistened by the steam.

13. A process for producing a soluble coffee product comprising:
(a) comminuting a frozen coffee extract into frozen particles under chilled conditions and separating the frozen particles into an oversize fraction of particle size above about 1.1 mm (16 US standard mesh) and a remainder fraction;
(b) subjecting the remainder fraction to reduced pressure to cause sublimation of frozen water from and drying of the remainder fraction to obtain freeze-dried particles;
(c) separating the freeze-dried particles into a large-sized fraction of particle size above about 0.87 mm (20 US standard mesh) and a fines fraction;
(d) separating the large-sized fraction into a by-pass fraction and a major fraction, the by-pass fraction comprising about 2% to about 20% by weight of the large-sized fraction;
(e) combining the major fraction and the fines fraction and steam-darkening the particles of the combined fractions to a color of less than about 70 Agtron units, and then drying the darkened particles; and
(f) combining the dried, darkened particles and the by-pass fraction.

14. A process according to claim 13 in which, in step (a), the frozen particles are separated at a temperature of less than −40° C.

15. A process according to claim 13 in which, in step (a), the oversize fraction has a particle size greater than about 1.5 mm (12 US Standard mesh).

16. A process according to claim 13 in which, in step (c), the large-sized fraction has a particle size above about 0.87 mm (20 U.S. standard mesh) but less than about 1.5 mm (12 US Standard mesh).

17. A process according to claim 13 further comprising size-reducing the oversize fraction particles to obtain further remainder fraction particles.

18. A process according to claim 17 further comprising splitting the oversize fraction particles into two or more fractions and size-reducing the two or more fractions.

19. A process according to claim 18 in which the oversize fraction is split into a first fraction having particles of size greater than about 11.1 mm, a second fraction having particles of size of between about 5.2 mm and about 11.1 mm, and a third fraction having particles of size less than about 5.2 mm and greater than about 1.5 mm.

20. A process according to claim 18 in which the particles of each oversize fraction are size-reduced by passing the particles through a pair of rotating rollers wherein one of the rollers has knives spaced apart to cut the particles.

21. A process according to claim 20 further comprising blowing gas at a temperature below −40° C. between the rollers.

22. A process according to claim 13 in which, in step (e), the particles of the combined fractions are darkened by passing the particles in a stream through a moistening zone and directing steam inwardly towards a center of the stream from about the stream so that the stream is surrounded and moistened by the steam.

23. A process according to claim 22 in which the darkened particles are dried upon leaving the moistening zone by directing a hot gas at the stream of darkened particles.

* * * * *